United States Patent
Lombardo et al.

(10) Patent No.: US 12,306,336 B2
(45) Date of Patent: May 20, 2025

(54) RADAR SYSTEM WITH BALANCING OF THE RECEPTION CHANNELS OVER A PLURALITY OF RADAR CHIPS

(71) Applicant: Infineon Technologies AG, Neubiberg (DE)

(72) Inventors: Francesco Lombardo, Munich (DE); Alexander Melzer, Neutillmitsch (AT)

(73) Assignee: Infineon Technologies AG, Neubiberg (DE)

( * ) Notice: Subject to any disclaimer, the term of this patent is extended or adjusted under 35 U.S.C. 154(b) by 608 days.

(21) Appl. No.: 17/648,858

(22) Filed: Jan. 25, 2022

(65) Prior Publication Data

US 2022/0236375 A1    Jul. 28, 2022

(30) Foreign Application Priority Data

Jan. 28, 2021    (DE) .......................... 102021102002.6

(51) Int. Cl.
*G01S 7/40*    (2006.01)

(52) U.S. Cl.
CPC .............. *G01S 7/40* (2013.01); *G01S 7/4017* (2013.01); *G01S 7/4021* (2013.01)

(58) Field of Classification Search
None
See application file for complete search history.

(56) References Cited

U.S. PATENT DOCUMENTS

| | | | |
|---|---|---|---|
| 2019/0214724 A1* | 7/2019 | Schrattenecker | G01S 7/4017 |
| 2021/0181326 A1* | 6/2021 | Kurvathodil | G01S 13/931 |

FOREIGN PATENT DOCUMENTS

DE    102018112092 A1    7/2019

* cited by examiner

*Primary Examiner* — Whitney Moore
(74) *Attorney, Agent, or Firm* — Harrity & Harrity, LLP (57) ABSTRACT

In some implementations, a radar device comprises: a clock input configured to receive a clock signal, a local oscillator configured to generate a first RF local oscillator signal based on the clock signal, and also an RF input configured to receive a second RF local oscillator signal. The radar device further comprises a phase shifter configured to shift the phase of the first RF local oscillator signal or of the second RF local oscillator signal by a settable phase value. A monitor circuit is configured to combine the first RF local oscillator signal and the second RF local oscillator signal and to generate a sequence of signal values based on the combined signal. A computing unit is configured to determine the relative phase of the second RF local oscillator signal in relation to the first RF local oscillator signal based on the sequence of signal values.

22 Claims, 3 Drawing Sheets

RADAR SYSTEM WITH BALANCING OF THE RECEPTION CHANNELS OVER A PLURALITY OF RADAR CHIPS

CROSS REFERENCE TO RELATED APPLICATION

This application claims priority to German Patent Application No. 102021102002.6, filed on Jan. 28, 2021, the contents of which are incorporated by reference herein in their entirety.

TECHNICAL FIELD

The present description relates to the field of radar sensors, in particular to a radar system having a plurality of radar chips.

BACKGROUND

Radar sensors are used in a multiplicity of applications for detecting objects, wherein the detecting usually comprises measuring distances and speeds of the detected objects. In the automotive field, in particular, there is an increasing need for radar sensors which can be used, inter alia, in driving assistance systems (Advanced driver assistance systems, ADAS) such as, for example, in cruise control (ACC, Adaptive Cruise Control, or Radar Cruise Control) systems. Such systems can automatically adapt the speed of an automobile in order thus to maintain a safe distance from other automobiles ahead (and also other objects and pedestrians). Further applications in the automotive field are, for example, blind spot detection, lane change assist, collision warning, pedestrian detection, and the like. In the field of autonomous driving, radar sensors and systems having a plurality of sensors will be utilized for the control of autonomous vehicles.

Modern integrated radar systems usually comprise a multiplicity of transmission and reception channels in order to enable a high angular resolution during the detection of objects in the field of view of the radar system (radar target) using beamforming techniques. The phases of the emitted and received radar signals play a part for determining the azimuth angle of a detected object, and the phase shifts caused in the different transmission and reception channels (which can be integrated in different radar chips) are therefore also relevant. The phase shifts are moreover subject to temperature- and aging-dictated drift and to production-dictated variations.

SUMMARY

Implementations described herein relate to, in the case of a radar system having a plurality of channels integrated in a plurality of radar chips, measuring the phase drift (variation of the phases relative to one another) and thereby enabling a phase calibration.

Some implementations described herein enable measuring a phase drift and thereby enabling a phase calibration using a device as claimed in claim 1 and a method as claimed in claim 9. The dependent claims relate to various example implementations and further developments.

A radar device is described below. In accordance with one example implementation, the device comprises the following: a clock input configured to receive a clock signal, a local oscillator configured to generate a first RF local oscillator signal based on the clock signal, and also an RF input configured to receive a second RF local oscillator signal. The device further comprises a phase shifter configured to shift the phase of the first RF local oscillator signal or of the second RF local oscillator signal by a settable phase value. A monitor circuit is configured to combine the first RF local oscillator signal and the second RF local oscillator signal and to generate a sequence of signal values based on the combined signal. In this case, a specific phase value of a corresponding sequence of phase values is set for each signal value of the sequence of signal values. A computing unit is configured to determine the relative phase of the second RF local oscillator signal in relation to the first RF local oscillator signal based on the sequence of signal values.

A further example implementation comprises a corresponding method for a radar chip.

BRIEF DESCRIPTION OF THE DRAWINGS

Example implementations are explained in greater detail below with reference to figures. The illustrations are not necessarily true to scale and the example implementations are not restricted only to the aspects illustrated. Rather, importance is attached to illustrating the principles underlining the example implementations. In the figures.

DETAILED DESCRIPTION

Figure 1:
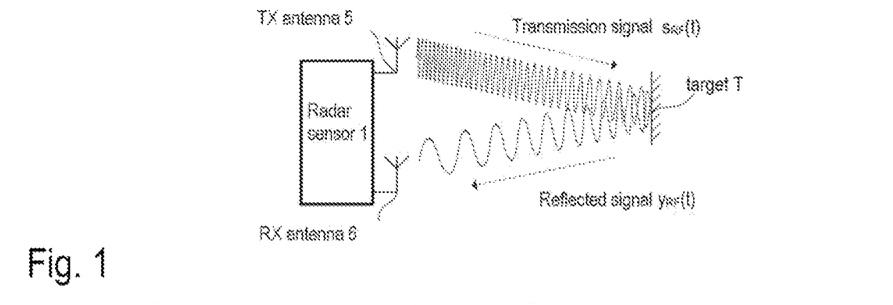
FIG. 1 is a schematic diagram for illustrating the functional principle of a frequency-modulated continuous-wave (FMCW) radar system for distance and/or speed measurement.

FIG. 1 illustrates, in a schematic diagram, the application of a frequency-modulated continuous-wave radar system—usually referred to as FMCW radar system—as sensor for the measurement of distances (including azimuth angles) and speeds of objects, which are usually referred to as radar targets. However, this is only one example and the concepts described here are not restricted to FMCW radar systems. Inter alia, the concepts described here can also be applied to phase-modulated continuous-wave (PMCW) radar systems, to radar systems that use pulse compression techniques, etc.

In the present example from FIG. 1, the radar device 1 comprises separate transmitting (TX) and receiving (RX) antennas 5 and 6 respectively (bistatic or pseudo-monostatic radar configuration). It should be noted, however, that a single antenna can also be used, which serves simultaneously as transmitting antenna and as receiving antenna (monostatic radar configuration). The transmitting antenna 5 emits a continuous RF signal $s_{RF}(t)$, which is frequency-modulated for example with a type of sawtooth signal (periodic, linear frequency ramp). The emitted signal $s_{RF}(t)$ is backscattered at the radar target T and the backscattered/reflected signal $y_{RF}(t)$ (echo signal) is received by the receiving antenna 6. FIG. 1 shows a simplified example; in practice, radar sensors are systems having a plurality of transmission (TX) and reception (RX) channels in order also to be able to ascertain the angle of incidence (Direction of Arrival, DoA) of the backscattered/reflected signal $y_{RF}(t)$ and thus to be able to localize the radar target T more accurately (distance and azimuth angle).

Figure 2:
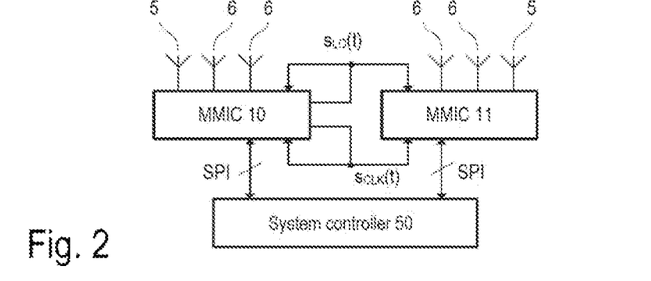
FIG. 2 shows an example for illustrating the basic structure of a radar system constructed from a plurality of radar chips.

FIG. 2 is a block diagram which illustrates by way of example one possible structure of a radar system 1 (radar sensor) comprising a plurality of radar chips, which are also referred to as monolithically microwave integrated chips (MMICs). In some implementations, the radar system comprises two MMICs 10 and 11. In some implementations, the radar system can comprise three or more MMICs. Each of the MMICs comprises one or more transmission (TX) channels and one or more reception (RX) channels, which are coupled respectively to transmitting antennas 5 and receiving antennas 6. In the implementation illustrated, each MMIC has in each case one TX channel and three RX channels, although this should be understood only as an example. In some implementations, the MMIC may have a plurality of TX channels. In some implementations, the MMIC can even have no TX channels at all (but a plurality of RX channels). In this case, the TX channels can be arranged in a separate transmitter MIMIC.

The two MMICs 10 and 11 are synchronized, that is to say that they use the same local oscillator signal $s_{LO}(t)$ (also referred to as LO signal) and also the same system clock signal $s_{CLK}(t)$. The local oscillator signal $s_{LO}(t)$ is generated by an RF oscillator (local oscillator, not illustrated), which can be integrated in one of the MMICs 10 or 11 or else in a further MMIC. In the present example, the local oscillator integrated in the MIMIC 10 is used and the local oscillator signal $s_{LO}(t)$ generated thereby is transmitted (e.g., via an RF stripline) to the MMIC 11 and optionally toward further MMICs.

In the implementations illustrated in FIG. 2, the radar system comprises a system controller 50, which can comprise for example a microcontroller, a digital signal processor or some other type of processor. The system controller 20 is configured to control the operation of the MMICs and to process the digital output signals (digital baseband signals, also referred to as digital radar signals) generated by the MMICs in order to detect radar targets (e.g., to calculate the position, speed and azimuth angle thereof). For this purpose, the controller 50 can comprise a computing unit, which can also include the processor mentioned above. However, the computing unit does not necessarily consist only of a processor that is able to execute software instructions. The computing unit can additionally also comprise hardwired computing circuits (hardware accelerators) and also further processors, optionally having a plurality of processor cores. The computing unit can also be a unit that is separate from the system controller 50. In this description, computing unit is understood to mean any entity composed of hardware, software, or a combination thereof which is configured to provide the functions necessary for detecting radar targets. The computing unit can also comprise a plurality of subsystems distributed among a plurality of hardware components.

The communication (data transmission) between the MMICs 10, 11 and the system controller 50 can be effected digitally, for example via one or more digital communication connections. Examples of such a communication connection are SPI (Serial Peripheral Interface), FC-Bus (Inter-Integrated Circuit Bus), and also high-speed connections such as e.g. MSB (Microsecond Bus), HSSL (High Speed Serial Link), CSI-2 (Camera Serial Interface) or LVDS (low voltage differential signal) interfaces. In some example implementations, time-critical signals are transmitted via a high-speed connection and non-time-critical signals are transmitted via slower connections such as e.g. SPI.

Figure 3:
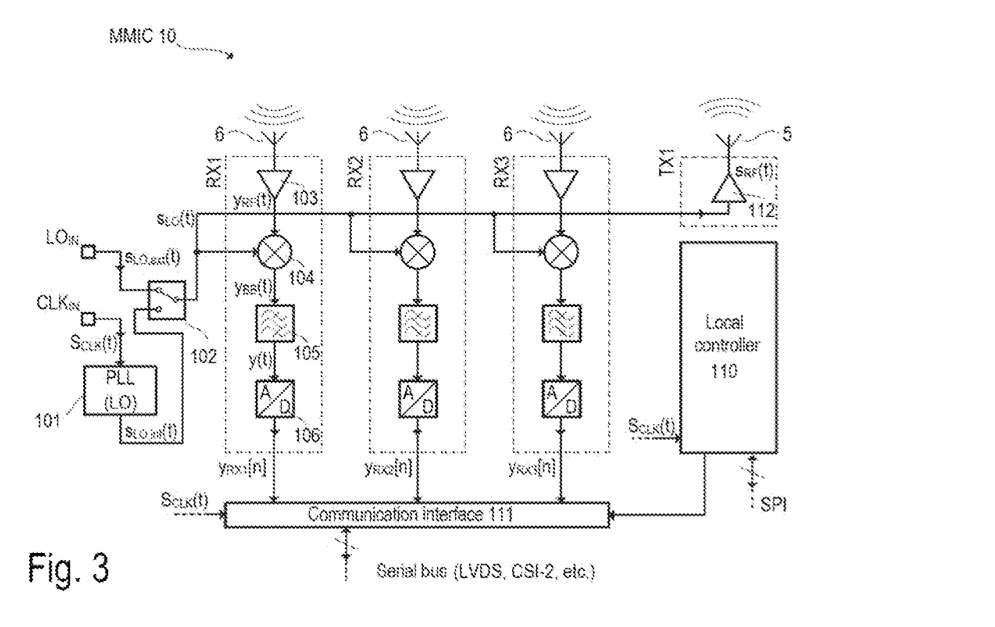
FIG. 3 shows the construction of a radar chip having a plurality of reception channels based on an example.

FIG. 3 illustrates the construction of a radar MIMIC 10 based on a simplified example. In the implementation illustrated, the MMIC 10 has three reception channels RX1, RX2 and RX3 and one transmission channel TX1. It should be noted at this juncture that when a plurality of transmission channels are used, so-called virtual channels can be implemented. By way of example, in a system having four physical reception channels and three physical transmission channels, twelve virtual channels can be implemented (four each per physical transmission channel).

The transmission channel TX1 substantially includes an RF power amplifier 112 configured to amplify the LO signal $s_{LO}(t)$ fed to the transmission channel TX1 and to emit it as antenna signal $s_{RF}(t)$ via the antenna 5 coupled to the output port of the transmission channel TX1. It goes without saying that the present example is simplified and the transmission channel TX1 can have further circuit components (e.g., configurable phase shifters). For the sake of simplicity, only those components needed to explain the example implementations and the concepts used by the latter are illustrated. In the implementation illustrated, the MMIC 10 comprises both a local oscillator 101, which can generate an internal LO signal $s_{LO,int}(t)$, and an RF input $LO_{IN}$, at which an LO signal $s_{LO,ext}(t)$ generated outside the MMIC 10 can be received. An RF switch 102 forwards either the signal $s_{LO,int}(t)$ generated by the local oscillator (internal LO signal) or the signal $s_{LO,ext}(t)$ fed to the RF input $LO_{IN}$ (external LO signal) as local oscillator signal $s_{LO}(t)$ to the transmission and reception channels. That is to say that, depending on the state of the RF switch 102, $s_{LO}(t)=s_{LO,int}(t)$ holds true or $s_{LO}(t)=s_{LO,ext}(t)$ holds true.

The three reception channels RX1, RX2, and RX3 are constructed substantially identically. The MMICs 10 and 11 (and optionally further MMICs) can also be constructed identically or similarly. The reception channel RX1 will be described as representative of all the reception channels. In accordance with FIG. 3, the reception channel RX1 has an RF amplifier 103 (e.g. a Low Noise Amplifier, LNA) configured to amplify the RF radar signal $y_{RF}(t)$ received at the antenna port of the reception channel (which is coupled to a receiving antenna 6). The amplified RF radar signal is designated by $y_{RF}(t)$.

The amplified RF radar signal $y_{RF}(t)$ is fed to a first RF port of a mixer 104. The LO signal $s_{LO}(t)$ is fed to a second RF port of the mixer 104. The mixer 104 substantially carries out a multiplication of the amplified RF radar signal $y_{RF}(t)$ by the LO signal $s_{LO}(t)$, which results in a downconversion of the amplified RF radar signal $y_{RF}(t)$ from the RF band to baseband. The resulting baseband signal is designated by $y_{BB}(t)$. The baseband signal $y_{BB}(t)$ is fed to an analog signal processing chain 105, which includes a lowpass filter, in particular, in order to suppress undesired sidebands and image frequencies. Furthermore, the signal processing chain 105 can contain a high-pass filter, in order to suppress a DC component (DC offset) of the baseband signal $y_{BB}(t)$, and one or more amplifiers.

The baseband signal preprocessed in analog fashion by the analog signal processing chain 105 is designated by y(t). This signal is digitized using an analog-to-digital converter 106 and the resulting digital signal is referred to as a digital radar signal or digital baseband signal $y_{RX1}[n]$, which can also be regarded as an output signal of the reception channel RX1. As mentioned, the other reception channels are constructed substantially identically and therefore supply the digital baseband signals $y_{RX2}[n]$ and $y_{RX3}[n]$. It goes without saying that the present example is simplified and the reception channel RX1 can have further circuit components in the analog and digital sections (e.g. configurable detectors, filters, decimators, phase shifters, etc.). Some components have been omitted in the figures, in order not to complicate the latter unnecessarily. The analog-to-digital converter 106 can oversample the analog signal y(t) and the digital output signal of the analog-to-digital converter 106 can be digitally preprocessed (e.g., decimated and digitally filtered).

It should be noted at this juncture that the mixer 104 can be constructed as a single stage or can contain a plurality of mixer stages, wherein the amplified RF radar signal $y_{RF}(t)$ is converted into an intermediate frequency band in a first mixer stage and into baseband in a further mixer stage. The output signal of the last mixer stage is always referred to as baseband signal $y_{BB}(t)$ here. The mixer 104 can also be a so-called IQ mixer, which supplies two baseband signals, which are referred to as in-phase signal and quadrature signal and can also be regarded as the real part and imaginary part of a complex-valued baseband signal. The applicability of the concepts and example implementations described here does not depend on whether the reception channels output real or complex-valued (digital) radar signals.

As mentioned, the digital radar signals $y_{RX1}[n]$, $y_{RX2}[n]$ and $y_{RX3}[n]$ can be transmitted via a communication interface 111 to a computing unit configured to detect radar targets (e.g. using range Doppler signal analysis). The transmission can be effected via a serial high-speed connection, for example. It should be mentioned at this juncture that in this example the digital radar signals $y_{RX1}[n]$, $y_{RX2}[n]$ and $y_{RX3}[n]$ (output signals of the analog-to-digital converters in the RX channels RX1, RX2 and RX3, respectively) are transmitted to the computing unit directly via the communication connection mentioned. However, this is not necessarily the case. The MMIC 10 can also contain a digital frontend, in which the digital radar signals $y_{RX1}[n]$, $y_{RX2}[n]$, $y_{RX3}[n]$ and $y_{RX4}[n]$ are preprocessed as mentioned. By way of example, the digital radar signals $y_{RX1}[n]$, $y_{RX2}[n]$, $y_{RX3}[n]$ and $y_{RX4}[n]$ can be subjected to filtering and/or decimation in the digital frontend. Furthermore, it is possible for a Fourier transformation already to take place in the digital frontend and for the transformed signals to be transmitted via the communication connection. The digital frontend in the radar chips can also be regarded as part of the computing unit mentioned.

The MMIC 10 also contains a local controller 110 configured to control and to coordinate the operation of the circuit components contained in the MIMIC 10. The local controller 110 can also be configured to receive data (e.g. control commands) from the system controller 50 via a communication connection. The communication connection can be an SPI bus, for example. It is also possible for the local controller 110 to use the communication interface 111 for communication with the system controller.

As already mentioned in the introduction, the phases of the baseband signals supplied by the reception channels RX1, RX2, and RX3 may be important for accurate detection of the radar targets (in particular for a good angular resolution). The circuit components (in particular the active circuit components) contained in the reception channels of an MIMIC can cause phase shifts. The reception channels of a particular radar MIMIC, with regard to the phase shift caused by them, behave substantially the same (with regard to temperature drift, aging effects, etc.) because the reception channels of an MMIC are practically identical in a manner governed by production on account of the integration in the same chip. Two reception channels integrated in different MMICs (e.g. MMICs 10 and 11, see FIG. 2) can behave differently with regard to the phase shift (e.g. different drift in the case of temperature fluctuations), which can adversely affect the accuracy of the detection of the radar targets if the phase shifts are not taken into account.

FIG. 3 likewise illustrates a clock input $CLK_{IN}$, at which a system clock signal $s_{CLK}(t)$ can be fed to the MIMIC 10. In contrast to the LO signal $s_{LO}(t)$, which usually has a frequency of a number of GHz, the system clock signal $s_{CLK}(t)$ has a significantly lower frequency, for example 50 MHz. The system clock signal $s_{CLK}(t)$ can be used, inter alia, to clock the local oscillator, e.g. the system clock signal serves as a reference signal for the phase locked loop contained in the local oscillator 101. The local control unit 110 and the communication interface 111 can also use the system clock signal $s_{CLK}(t)$ in order to clock digital circuit components and synchronous circuits contained therein.

As mentioned above, for an accurate detection/localization of radar targets it is important that the phase relationships between the emitted radar signals are known and/or constant. The same applies to the LO signals used by the individual reception channels (in particular the reception mixers). The relevant phases of the RF signals within an individual MMIC may be set such that, for example, all reception channels see the LO signal with a defined phase. However, if the LO signal is generated externally and received via the RF input $LO_{IN}$, then the phase of the received LO signal $s_{LO,ext}(t)$ is not defined and is generally not constant either, but rather is subject to the drift phenomena mentioned above.

Figure 4:
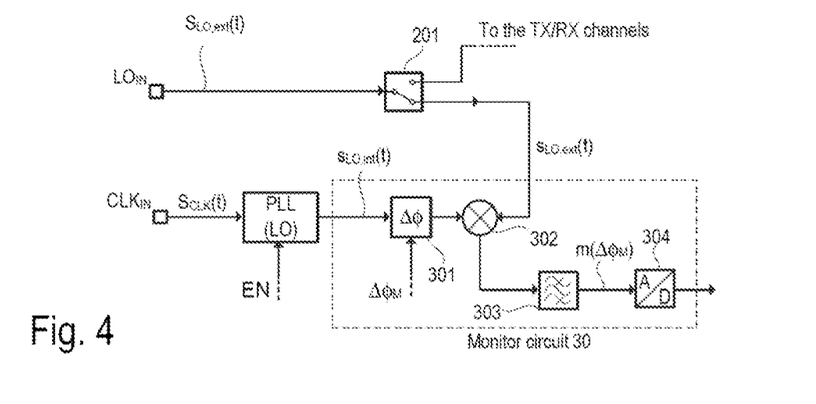
FIGS. 4-6 show different variants of a concept for measuring the relative phases of a local oscillator signal received at an external RF input of a radar chip.
Figure 5:
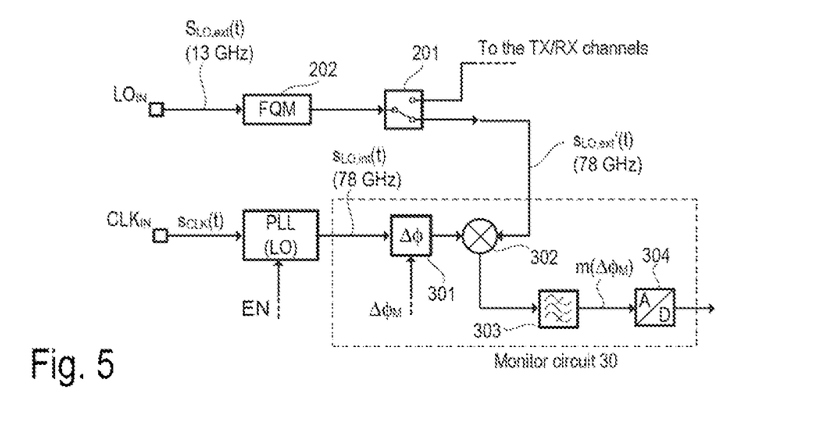
Figure 6:
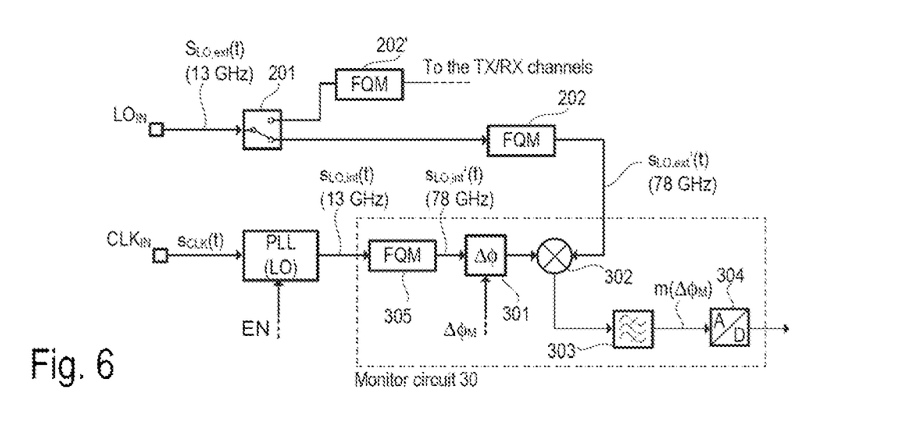

FIGS. 4 through 6 explained below show different variants of a concept for calibrating the phase of the LO signal $s_{LO,ext}(t)$ received at the RF input $LO_{IN}$ (and generated externally). The example implementations are aimed at determining (e.g., measuring) information about the phase of the received LO signal $s_{LO,ext}(t)$. This information can then be used to set and adapt the phase at one or a plurality of points in the MMIC. Some components of a radar chip are not illustrated in FIGS. 4-6 in order to keep the illustration simple. Furthermore, the radar chip can comprise a plurality of transmission and reception channels, in a manner similar to that illustrated in FIG. 3.

A measurement of a phase may utilize a reference phase to which the phase sought relates. In other words, what is measured is not an absolute phase value, but rather always a phase relative to the phase of a reference signal (reference phase). One problem that is solved in the case of the example implementations described here is that of providing an RF reference signal and thus a reference phase which is at least approximately the same in a plurality of different radar chips (MMICs), such that phase values of the LO signal $s_{LO,ext}(t)$ received at the RF input $LO_{IN}$ that are measured in different radar chips are comparable.

The diagrams illustrated in FIGS. 4-6 in each case represent the circuit components of a radar chip which are used for the phase measurement. What the example implementations have in common is that the internal local oscillator 101 of the respective radar chip (e.g., radar chip 11, cf. FIG. 2) is used to generate the abovementioned RF reference signal for the phase measurement. As mentioned, the internal local oscillator 101 uses the system clock signal $s_{CLK}(t)$ to generate the internal LO signal $s_{LO,int}(t)$ on the basis thereof. In the case of a system having a multiplicity of radar chips as well, the system clock signal $s_{CLK}(t)$ is generated by a single clock generator and distributed to all the radar chips, such that all radar chips receive the same system clock signal $s_{CLK}(t)$ (at the clock input $CLK_{IN}$). The lines for distributing the system clock signal can be laid out symmetrically through suitable circuit design such that the phases of the system clock signals $s_{CLK}(t)$ arriving at the radar chips are also as far as possible identical. For this reason, it can also be assumed that the local oscillators 101 integrated in the individual radar chips in each case generate approximately the same internal LO signal $s_{LO,int}(t)$, for which reason the internal LO signal $s_{LO,int}(t)$ (or a signal based thereon) is suitable as reference signal for a phase measurement and can be used for that purpose.

In accordance with the implementation shown in FIG. 4, the radar chip comprises a monitor circuit 30 besides the RX and TX channels, both the externally generated LO signal $s_{LO,ext}(t)$ received at the RF input $LO_{IN}$ and the internal LO signal $s_{LO,int}(t)$ generated in the radar chip by the local oscillator 101 being fed to the monitor circuit. During normal radar operation, the RF switch 201 allows the LO signal $s_{LO,ext}(t)$ to be forwarded to the RX and TX channels (cf. FIG. 3). The RF switch 102 shown in FIG. 3 is not shown in the following examples. It can nevertheless be present. For the following description, it is additionally assumed that for the purposes of phase measurement the LO signals $s_{LO,ext}(t)$ and $s_{LO,int}(t)$ are unmodulated continuous wave signals (CW signals) having a defined frequency in the gigahertz range. The system clock signal $s_{CLK}(t)$ is usually in the range of 50-200 MHz.

The monitor circuit 30 is configured to combine the external LO signal $s_{LO,ext}(t)$ and the internal LO signal $s_{LO,int}(t)$ (RF reference signal) and to determine the (relative) phase $\phi_{LO,ext}$ of the LO signal $s_{LO,ext}(t)$ received at the RF input $LO_{IN}$ based on the combined signal. In this context, "relative phase" denotes the phase in relation to the internal LO signal $s_{LO,int}(t)$, which serves as reference for the phase measurement (relative phase thus denotes the phase difference with respect to the reference phase). For this purpose, in the example illustrated in FIG. 4, the monitor circuit 30 comprises a mixer 302 configured to mix the external LO signal $s_{LO,ext}(t)$ with the internal LO signal $s_{LO,int}(t)$, a phase shifter 301 being connected upstream of one of the RF inputs of the mixer 302.

In the present case, the phase shifter 301 is configured to shift the internal LO signal $s_{LO,int}(t)$ by a settable phase shift $\Delta\phi_M$. Since the two LO signals $s_{LO,ext}(t)$ and $s_{LO,int}(t)$ in the implementation from FIG. 4 have the same frequency $f_{LO}$ (e.g. $f_{LO}$=78 GHz), the mixer output signal, after low-pass filtering (e.g. using a low-pass filter 303), only has a DC component, which is dependent however on the set phase shift $\Delta\phi_M$ of the phase shifter 301. The filtered output signal of the mixer 302 is therefore designated by $m(\Delta\phi_M)$. The signal $m(\Delta\phi_M)$ can be digitized (e.g. using the analog-to-digital converter 304); the corresponding digital signal is designated by m[k], and the associated phase by $\Delta\phi_M[k]$.

Theoretically a single sample m[k] would be sufficient to calculate the phase $\phi_{LO,ext}$ of the LO signal $s_{LO,ext}(t)$ received at the RF input $LO_{IN}$ given a known phase shift $\Delta\phi_M[k]$. In order to increase the accuracy and to reduce the influence of noise, a plurality of samples m[k] are used for a measurement, in which case a different phase shift $\Delta\phi_M[k]$ can be set for each sample m[k]. In one example implementation, N samples m[k] are determined, wherein N is a power of two (e.g. N=$2^p$ where p is a positive integer) and wherein for associated phase shifts $\Delta\phi_M[k]=2k\pi/N$ rad it holds true that (k=0, ..., N−1). For the case N=8, for the sequence of phase shifts {0, π/4, π/2, 3π/4, π, 5π/4, 3π/2, 7π/4}, a corresponding sequence of samples m[k] (where k=0, ... 7) is determined. Since the sequence of phase shifts includes equidistant phase values over one period (one full revolution), the sought phase of the LO signal $s_{LO,ext}(t)$ received at the RF input $LO_{IN}$ can be calculated relatively simply using Fourier transformation, in particular using the known FFT algorithm (FFT=Fast Fourier Transform). The FFT algorithm yields a corresponding sequence M[u] of spectral values (where u=0, ... , 7), the phase information sought being in the second spectral value M[1]. The phase sought is the argument of the spectral value M[1], e.g.

$\phi_{LO,ext}=\arg\{M[1]\}$, or $\phi_{LO,ext}=\tan^{-1}(\text{Im}\{M[1]\}/\text{Re}\{M[1]\})$.

In this case, the operators Im{•} and Re{•} supply the imaginary part and the real part, respectively, of the complex-valued spectral value M[1].

In every MMIC that receives an external LO signal, the phase $\phi_{LO,ext}$ can be measured continually (e.g., at regular time intervals or from time to time as described above). The phase measurement can also be carried out in modulation pauses during radar operation. The measured phase information can be used, firstly, to adapt and calibrate the phases of the RF transmission signals generated in the transmission channels and of the LO signals used in the reception channels. Secondly, the measured phase information can be used to monitor radar operation. In some implementations, the radar operation may be monitored based on variations of the measured phase information. If the variation is too great (e.g., greater than a threshold variation), it can be assumed that the detection of radar targets is unreliable or at least no longer as accurate as it should be in accordance with the specifications of the radar sensor.

Nowadays the LO signal $s_{LO}(t)$ processed by the transmission and reception channels of a modern automobile radar system is usually in the range of between 60 and 90 GHz. However, it may be advantageous to generate the LO signal $s_{LO,ext}(t)$ with a lower frequency, for example in the range of between 10 and 15 GHz, and to distribute it to the individual radar chips of a radar system. In each radar chip, the frequency $f_{LO,ext}$ of the LO signal $s_{LO,ext}(t)$ received at the RF pin $LO_{IN}$ is then increased by a constant factor g using a frequency multiplier. One implementation is illustrated in FIG. 5. The output signal $s_{LO,ext}'(t)$ of the frequency multiplier 202 is then fed, via the RF switch 201, for example, optionally to the transmission and reception channels or to the monitor circuit 30. In the example illustrated in FIG. 4, the internal LO signal $s_{LO,int}(t)$ is already generated with the higher frequency $f_{LO,int}=g \cdot f_{LO,ext}$. In the example illustrated, the factor g (frequency multiplier) is six ($f_{LO,ext}$=78 GHz, $f_{LO,int}$=13 GHz), but it can also be greater or less than six. In some implementations, apart from the frequency multiplier 202, the implementation from FIG. 5 is the same as the circuit from FIG. 4 and reference is made to the explanations in this regard further above.

The implementation from FIG. 6 is a modification of the circuit from FIG. 5. In comparison with FIG. 5, the positions of the frequency multiplier 202 and of the RF switch 201 are interchanged. That is to say that the frequency multiplier 202 is connected between the RF switch 201 and the monitor circuit 30. For this reason, a further frequency multiplier 202' is provided between the RF switch 201 and the TX/RX channels. In accordance with FIG. 6, as in the previous implementation, the monitor circuit 30 receives the output signal of the frequency multiplier 202 with the higher frequency $g \cdot f_{LO,ext}$ (78 GHz in the example illustrated).

Furthermore, in the implementation from FIG. 6, the internal local oscillator 101 generates the LO signal $s_{LO,int}(t)$ initially also with a lower frequency (e.g. 13 GHz), for which reason the monitor circuit 30 likewise comprises a frequency multiplier 305 connected downstream of the local oscillator 101. That is to say that the frequency multiplier 305 is connected between the local oscillator 101 and the phase shifter 301. In another example implementation, the phase shifter and the frequency multiplier 305 can also be interchanged. For the rest, the example from FIG. 6 is the same as the circuit from FIG. 5 and reference is made to the explanations in this regard further above.

Figure 7:
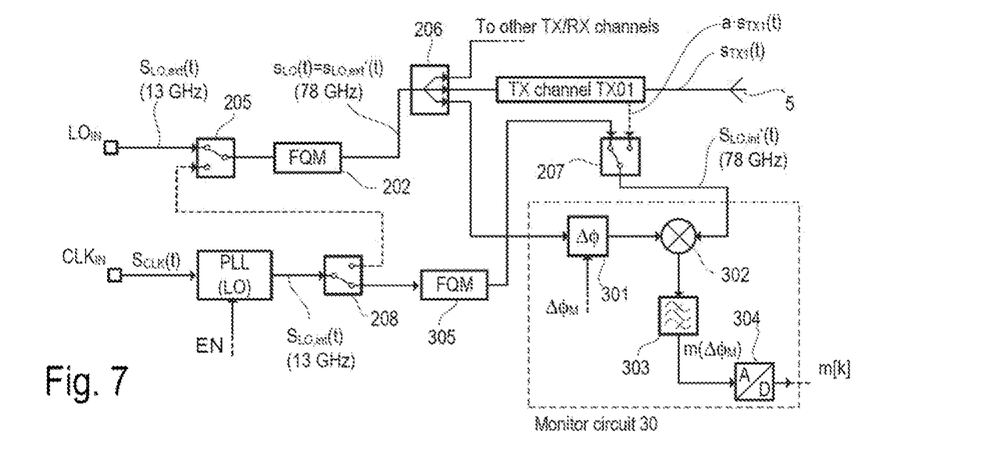
FIG. 7 illustrates an extension of the concept from FIGS. 4-6.

FIG. 7 illustrates a further example implementation, which is similar to the implementations from FIGS. 5 and 6, but in which the monitor circuit 30 can carry out an additional measurement. The circuit illustrated in FIG. 7 is part of a radar chip having an RF input $LO_{IN}$ for receiving an LO signal $s_{LO,ext}(t)$ with a frequency $f_{LO,ext}$, the LO signal being generated by an external circuit, and a clock input $CLK_{IN}$ for receiving a system clock signal $s_{CKL}(t)$ (clock frequency $f_{CLK}$). The radar chip comprises an integrated local oscillator 101 configured to generate, based on the system clock signal $s_{CKL}(t)$, an (internal) LO signal $s_{LO,int}(t)$ having, in the present example, the same frequency as the LO signal $s_{LO,ext}(t)$ received at the RF input $LO_{IN}$.

The LO signal $s_{LO,ext}(t)$ received at the RF input $LO_{IN}$ is fed via the RF switch 205 to the frequency multiplier 202, which increases the frequency of the LO signal $s_{LO,ext}(t)$ by the factor g as in the previous implementations. The output signal of the frequency multiplier 202 is designated by $s_{LO,ext}'(t)$ and its frequency is $g \cdot f_{LO,ext}$. In some implementations, the lower LO frequency $f_{LO,ext}$ is 13 GHz, and the higher LO frequency is 78 GHz (corresponding to g=6). The LO signal $s_{LO,ext}'(t)$ (with frequency $g \cdot f_{LO,ext}$) is distributed as LO signal $s_{LO}(t)$ via the power divider 206 to the TX and RX channels and is processed by the latter.

The LO signal $s_{LO,int}(t)$ generated by the local oscillator 101 is likewise fed (via the RF switch 208) to the frequency multiplier 305, the output signal of which is designated by $s_{LO,int}'(t)$ and that likewise has the higher LO frequency $g \cdot f_{LO,ext}$. The significance of the RF switches 205 and 208 will also be explained later. Both (frequency-multiplied) LO signals $s_{LO,int}'(t)$ and also $s_{LO,ext}'(t)$ are fed to the monitor circuit 30. The latter is constructed the same as in the implementation from FIG. 5, but in accordance with FIG. 7 the LO signal $s_{LO,ext}'(t)$ is fed to the mixer 302 via the phase shifter 301, whereas the LO signal $s_{LO,int}'(t)$ serving as reference signal is fed (via the RF switch 207) to the mixer 302 without an additional phase shift. As mentioned, it ultimately makes no difference which of the RF inputs of the mixer 302 is the one which the phase shifter 301 is connected upstream of. As already described further above, for a sequence of phase shifts Mm[k], a corresponding sequence of samples m[k] is determined, wherein k=0, ... N−1. The length N of the sequence can be a power of two (but that need not necessarily be the case), and the sequence of phase shifts Mm[k] covers one or more full revolutions ($2\pi=360°$); by way of example, it holds true that: $\Delta\phi_M[k]=2\pi mk/N$ for m=1 (e.g. one full revolution by $2\pi$) and k=0, ... N−1. The phase $\phi_{LOext}$ sought can then be determined from the Fourier transformation of the sequence m[k], as described above.

Figure 8:
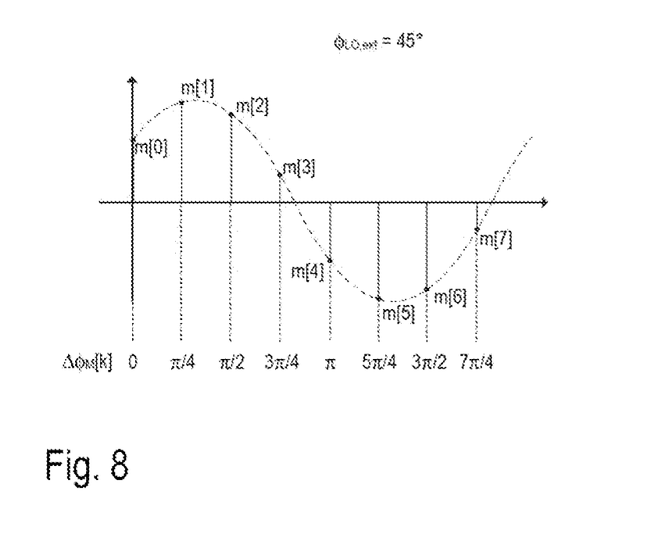
FIG. 8 visualizes the signal processing for calculating the phase sought.

The concept of the phase measurement using an FFT algorithm is summarized schematically again in FIG. 8, wherein in the implementation illustrated N=$2^3$=8 and consequently $\Delta\phi_M[k]=\{0, \pi/4, \pi/2, 3\pi/4, \pi, 5\pi/4, 3\pi/2, 7\pi/4\}$. The associated sequence of measurement values (samples) m[k] is illustrated in the diagram in FIG. 8. The FFT algorithm will yield a sequence of eight spectral values M[u], wherein the first spectral value M[0] represents the DC component and the second spectral value M[1] represents the fundamental and all other spectral values (harmonics) are zero. The argument of the spectral value M[1] is the phase sought, around 45° in the implementation illustrated.

For the measurement of the phase $\phi_{LO,ext}$, the RF switches 205, 207 and 208 are configured as illustrated in FIG. 7. The RF switches 205 and 208 serve to enable the radar chip also to be configured such that the internal LO signal $s_{LO,int}(t)$ is used for the operation of the TX and RX channels and no external LO signal is required at the RF input. The RF switch 207 serves the purpose that, instead of the LO signal $s_{LO,int}(t)$, optionally one of the output signals of the TX channels can be fed to the monitor circuit 30, that being the output signal $s_{TX01}(t)$ of the transmission channel TX01 in the present example. For this purpose, directly at the output of the transmission channel TX01, part of the transmission power is coupled out using a coupler and is fed to the monitor circuit 30 via the RF switch 207. In this case, the monitor circuit 30 measures the phase $\phi_{TX01}$ of the transmission signal $s_{TX01}(t)$ in relation to the LO signal $s_{LO}(t)$ distributed by the power divider 206. The same measurement can be repeated for all TX channels integrated in the radar chip.

A further example implementation relates to a method for a radar chip of a radar system. The method comprises receiving a clock signal (cf. FIGS. 4-7, clock signal $s_{CLK}(t)$) at a clock input of a radar chip, generating a first RF local oscillator signal (cf. FIGS. 4-7, internal LO signal $s_{LO,int}(t)$) using a local oscillator integrated in the radar chip, and also receiving a second RF local oscillator signal (cf. FIGS. 4-7, external LO signal $s_{LO,ext}(t)$) at an RF input of the radar chip. Using a phase shifter (cf. FIGS. 4-7, phase shifter 301), the phase of the first RF local oscillator signal (generated in the radar chip) or of the second RF local oscillator signal (received from an external source) is altered by a settable phase value. In the examples from FIGS. 4-6, the phase it $\phi_{LO,int}$ of the first LO signal $s_{LO,int}(t)$ is altered by the settable value $\Delta\phi_M$ (optionally after frequency multiplication). In the implementation from FIG. 7, the phase $\phi_{LO,ext}$ of the second LO signal $s_{LO,ext}(t)$ is altered (after frequency multiplication).

The method further comprises generating a combined signal (cf. FIGS. 4-7, baseband signal $m(\Delta\phi_M)$) by combining the first RF local oscillator signal with the second RF local oscillator signal. The combining can be effected using an RF mixer. A sequence of signal values is generated, wherein a specific phase value of a corresponding sequence of phase values is set for each signal value of the sequence (see FIG. 8, sequence m[k] and sequence Mm[k]=$\{0, \ldots, 7\pi/4\}$). The method finally comprises determining (based on the sequence of signal values) the relative phase of the second RF local oscillator signal in relation to the first RF local oscillator signal (reference signal/reference phase). Determining the relative phase can be effected using an FFT algorithm, for example, as described above. In a radar system comprising a multiplicity of radar chips (MMICs), this method can be carried out in each radar chip that receives an external LO signal.

The invention claimed is:
1. A device comprising:
 a clock input configured to receive a clock signal;
 a local oscillator configured to generate a first RF local oscillator signal based on the clock signal;
 an RF input configured to receive a second RF local oscillator signal, wherein the RF input is an input terminal configured to receive the second RF local oscillator signal from an external signal line coupled to the input terminal;

a phase shifter configured to shift a phase of the first RF local oscillator signal or a phase of the second RF local oscillator signal by a settable phase value, a monitor circuit configured to generate a combined signal based on combining the first RF local oscillator signal and the second RF local oscillator signal and to generate a sequence of signal values based on the combined signal, wherein a specific phase value of a corresponding sequence of phase values is set for each signal value of the sequence of signal values; and a computing unit configured to determine a relative phase of the second RF local oscillator signal in relation to the first RF local oscillator signal based on the sequence of signal values.

2. The device as claimed in claim 1, further comprising one or more of:

a first frequency multiplier, which is connected between the local oscillator and the monitor circuit and is configured to multiply a frequency of the first RF local oscillator signal; or a second frequency multiplier, which is connected between the RF input and the monitor circuit and is configured to multiply a frequency of the second RF local oscillator signal.

3. The device as claimed in claim 1, wherein the monitor circuit further comprises:

an RF mixer configured to generate the combined signal by mixing the first RF local oscillator signal and the second RF local oscillator signal, wherein the combined signal is a baseband signal that is dependent on the settable phase value.

4. The device as claimed in claim 1,
wherein the combined signal has a DC component, and
wherein signal values of the sequence of signal values each represent an instance of the DC component of the combined signal.

5. The device as claimed in claim 1, wherein the monitor circuit further comprises:

an analog-to-digital converter configured to generate, based on the combined signal, a digital signal corresponding to the sequence of signal values.

6. The device as claimed in claim 1,
wherein the sequence of phase values contains equidistant phase values that are distributed uniformly over one or more full phase rotations.

7. The device as claimed in claim 1,
wherein the computing unit is configured to calculate a spectral line of the sequence of signal values for the calculation of the relative phase.

8. The device as claimed in claim 7,
wherein the spectral line is a complex number and an argument of the complex number is calculated for the calculation of the relative phase.

9. The device as claimed in claim 1, wherein the second RF local oscillator signal is an external RF local oscillator signal, and
wherein the input terminal is configured to receive the second RF local oscillator signal from an external local oscillator source via the external signal line, the external signal line and the external local oscillator source being external to the device.

10. The device as claimed in claim 1, wherein the second RF local oscillator signal originates from an external local oscillator source that is different from the local oscillator and is arranged external to the device.

11. The device as claimed in claim 10, wherein the device is a first radar chip and the external local oscillator source is a second radar chip.

12. A method for a radar system, comprising:
receiving a clock signal at a clock input of a radar chip;
generating a first RF local oscillator signal using a local oscillator integrated in the radar chip;
receiving a second RF local oscillator signal at an RF input of the radar chip, wherein the RF input is an input terminal configured to receive the second RF local oscillator signal from an external signal line coupled to the input terminal;
altering a phase of the first RF local oscillator signal or of the second RF local oscillator signal by a settable phase value using a phase shifter;
generating a combined signal by combining the first RF local oscillator signal with the second RF local oscillator signal, wherein a sequence of signal values is generated, and wherein a specific phase value of a corresponding sequence of phase values is set for each signal value of the sequence of signal values; and
determining, based on the sequence of signal values, a relative phase of the second RF local oscillator signal in relation to the first RF local oscillator signal.

13. The method as claimed in claim 12,
wherein generating the combined signal includes mixing the first RF local oscillator signal with the second RF local oscillator signal to generate a baseband signal, and
wherein the sequence of signal values represents DC components of the baseband signal for different phase values of the phase shifter.

14. The method as claimed in claim 12,
wherein before generating the combined signal, one or more of a frequency of the first RF local oscillator signal or a frequency of the second RF local oscillator signal is increased using a frequency multiplier.

15. The method as claimed in claim 12,
wherein the sequence of phase values contains equidistant phase values that are distributed uniformly over one or more full phase rotations.

16. The method as claimed in claim 15, wherein determining the relative phase comprises:
calculating a spectral value from the sequence of signal values.

17. The method as claimed in claim 16,
wherein the spectral value is a complex number and an argument of the complex number is calculated for a calculation of the relative phase.

18. A non-transitory computer-readable medium storing a set of instructions, the set of instructions comprising:
one or more instructions that, when executed by one or more processors of a radar system, cause the radar system to:
receive a clock signal at a clock input of a radar chip;
generate a first RF local oscillator signal using a local oscillator integrated in the radar chip;
receive a second RF local oscillator signal at an RF input of the radar chip, wherein the RF input is an input terminal configured to receive the second RF local oscillator signal from an external signal line coupled to the input terminal;
alter a phase of the first RF local oscillator signal or of the second RF local oscillator signal by a settable phase value using a phase shifter;

generate a combined signal by combining the first RF local oscillator signal with the second RF local oscillator signal, wherein a sequence of signal values is generated, and wherein a specific phase value of a corresponding sequence of phase values is set for each signal value of the sequence of signal values; and determine, based on the sequence of signal values, a relative phase of the second RF local oscillator signal in relation to the first RF local oscillator signal.

19. The non-transitory computer-readable medium of claim 18, wherein the one or more instructions, that cause the radar system to generate the combined signal, cause the radar system to:

generate the combined signal based on mixing the first RF local oscillator signal with the second RF local oscillator signal, wherein the combined signal comprises a baseband signal, and wherein the sequence of signal values represents DC components of the baseband signal for different phase values of the phase shifter.

20. The non-transitory computer-readable medium of claim 18, wherein prior to generating the combined signal, one or more of a frequency of the first RF local oscillator signal or a frequency of the second RF local oscillator signal is increased using a frequency multiplier.

21. The non-transitory computer-readable medium of claim 18, wherein the sequence of phase values contains equidistant phase values that are distributed uniformly over one or more full phase rotations.

22. The non-transitory computer-readable medium of claim 21, wherein the one or more instructions, that cause the radar system to determine the relative phase, cause the radar system to:

calculate a spectral value from the sequence of signal values.

* * * * *